(12) United States Patent
Muth

(10) Patent No.: US 9,003,765 B1
(45) Date of Patent: Apr. 14, 2015

(54) ENGINE HAVING A ROTARY COMBUSTION CHAMBER

(76) Inventor: Barry A. Muth, Creedmoor, NC (US)

(*) Notice: Subject to any disclaimer, the term of this patent is extended or adjusted under 35 U.S.C. 154(b) by 926 days.

(21) Appl. No.: 13/182,489

(22) Filed: Jul. 14, 2011

(51) Int. Cl.
  *F02G 3/02* (2006.01)
  *F02B 19/10* (2006.01)

(52) U.S. Cl.
  CPC ................... *F02B 19/1019* (2013.01)

(58) Field of Classification Search
  CPC ........ F02B 75/222; F02B 75/20; F02B 67/00; F02B 19/14
  USPC ........... 60/39.6; 123/190.14, 90.5, 80 R, 296, 123/202, 434, 54.6, 54.7, 54.8, 58.1, 123/253–273
  See application file for complete search history.

(56) References Cited

U.S. PATENT DOCUMENTS

| 2,373,304 | A  | * | 4/1945  | Garbeth    | 123/222   |
|-----------|----|---|---------|------------|-----------|
| 4,513,568 | A  | * | 4/1985  | Bajulaz    | 60/39.6   |
| 5,579,730 | A  | * | 12/1996 | Trotter    | 123/80 BA |
| 5,579,734 | A  |   | 12/1996 | Muth       |           |
| 5,816,203 | A  |   | 10/1998 | Muth       |           |
| 5,946,903 | A  | * | 9/1999  | Marquard   | 60/39.6   |
| 6,155,215 | A  |   | 12/2000 | Muth       |           |
| 6,247,461 | B1 | * | 6/2001  | Smith et al. | 123/568.2 |
| 6,412,273 | B1 | * | 7/2002  | Rohs       | 60/39.63  |
| 6,513,475 | B2 |   | 2/2003  | Muth       |           |
| 6,968,751 | B2 |   | 11/2005 | Shulenberger et al. | |
| 7,841,308 | B1 | * | 11/2010 | Muth       | 123/80 DA |
| 8,056,527 | B2 | * | 11/2011 | De Oliveira | 123/223  |
| 8,523,720 | B2 | * | 9/2013  | Reinhart et al. | 474/110 |
| 2007/0062469 | A1 | * | 3/2007 | Yakhnis   | 123/44 C  |
| 2007/0227345 | A1 | * | 10/2007 | Ruiz Martinez | 91/61 |

OTHER PUBLICATIONS

Attard, William P., et al., "A Turbulent Jet Ignition Pre-Chamber Combustion System for Large Fuel Economy Improvements in a Modern Vehicle Powertrain." SAE technical paper 2010-01-1457. SAE Int. J. Engines 3(2). May 5, 2010. SAE International, Warrendale, PA.

Verhelst, Sebastian, et al., "Investigation of Supercharging Strategies for PFI Hydrogen Engines," SAE technical paper 2010-01-0582. Apr. 12, 2010. SAE International, Warrendale, PA.

Nakamura, Y., et al., "Noble Hydrogen with Knock-less and Low NOx Emission Employing Hydrogen Gas-jet Combustion and Z-crankshaft Mechanism." SAE technical paper 2007-24-0122. Sep. 16, 2007. SAE International, Warrendale, PA.

* cited by examiner

*Primary Examiner* — Thai Ba Trieu
*Assistant Examiner* — Shafiq Mian
(74) *Attorney, Agent, or Firm* — Coats and Bennett, PLLC

(57) ABSTRACT

A poppet valve engine incorporates a single rotary combustion chamber serving multiple cylinders to decrease emissions and increase thermodynamic efficiency. Virtually zero emissions are achievable by on-board fuel reforming to hydrogen. Limited heat range exposure of the rotary combustion chamber, low temperature combustion, and ceramic coatings reduce heat loss while three stage combustion, intake and fuel preheating, and fuel reforming reduce combustion process irreversibility. A supercharger increases the power density to allow engine displacement reduction. A z-crankshaft assembly coupled with a pre-combustion chamber allow knock-less and stable hydrogen combustion at virtually all load and speed conditions. Variable compression, possible in certain configurations of the z-crankshaft assembly, further increases thermal efficiency.

19 Claims, 9 Drawing Sheets

ENGINE HAVING A ROTARY COMBUSTION CHAMBER

BACKGROUND OF THE INVENTION

Increasing political and environmental pressure is driving the quest for near zero emissive engines and increased efficiency to decrease U.S dependence on foreign oil and reduce greenhouse gas emissions. Fuel cell technology using hydrogen has been widely promoted as an alternative to the fossil fueled internal combustion engine (ICE) due to its perceived superior ability to achieve these goals. Unfortunately, fuel cells have several major hurdles to overcome before widespread use making this possible solution decades away. Meanwhile, the ICE will remain in use until that time.

In the past, the primary advantage of fuel cells over the ICE was potential thermal efficiency. Recent studies by the Department of Energy indicate that the ICE should be capable of producing thermal efficiencies that rival fuel cells. Therefore, a hydrogen fueled ICE promises a much quicker and less expensive option to meet emission and engine efficiency goals.

Using hydrogen as a transportation fuel has several problems. Two important hurdles are the lack of infrastructure to dispense the fuel and storage of hydrogen. Due to the very low density of hydrogen gas, large storage tanks are required to obtain sufficient vehicle range and the storage tanks must withstand relatively high pressures. To avoid these shortcomings, recent work at various research labs has investigated the use of on-board reforming commonly available fuels into higher grade fuels such as syngas and hydrogen. Several test devices have already been successful. While this technology is still being developed, this option appears to be a very promising solution to both the infrastructure and storage problems.

In current Hydrogen engines, backflash, pre-ignition and reduced power are common problems in premixed and port fuel injected engines. One method to minimize or eliminate these shortcomings is to employ direct fuel injection. However, direct injection requires very quick mixing of the hydrogen and air. Often, mixing is incomplete causing misfire, high $NO_x$ levels, reduced efficiency, and power loss.

Finally, even with direct injection, pre-ignition remains one of the most difficult challenges to hydrogen use. Compared to gasoline, hydrogen has a much lower ignition energy, wider flammability range and shorter quenching distance making it much more susceptible to engine hot spots and other causes of pre-ignition. New engine architecture is needed not only to address pre-ignition and incomplete mixing, but also other problems associated with conventional hydrogen ICE designs.

SUMMARY OF THE INVENTION

A conventional four stroke poppet valve engine is modified to include a rotary combustion chamber (RCC) and small pre-combustion chamber which sequentially serve all four cylinders of this preferred embodiment engine. More stable hydrogen combustion is possible with this engine as it reduces pre-ignition, misfire, and other combustion problems associated with hydrogen use. Although the RCC shares the benefits of improved hydrogen combustion with indirect injection (IDI) operation, it avoids the thermal efficiency penalty of IDI engines by reducing the operating thermal range of the RCC, increasing the RCC passage opening size, and coating the chamber and passage with ceramics. Preheating of the fuel and air, on-board fuel reforming, multistage and low temperature combustion, charge stratification, jet ignition, and variable compression enabled by a z-crankshaft reduce combustion process and heat transfer losses to further increase engine efficiency.

Other advantages of the present invention will become apparent and obvious from a study of the following description and accompanying drawings which are merely illustrative of such invention.

DETAILED DESCRIPTION OF THE INVENTION

Figure 1:
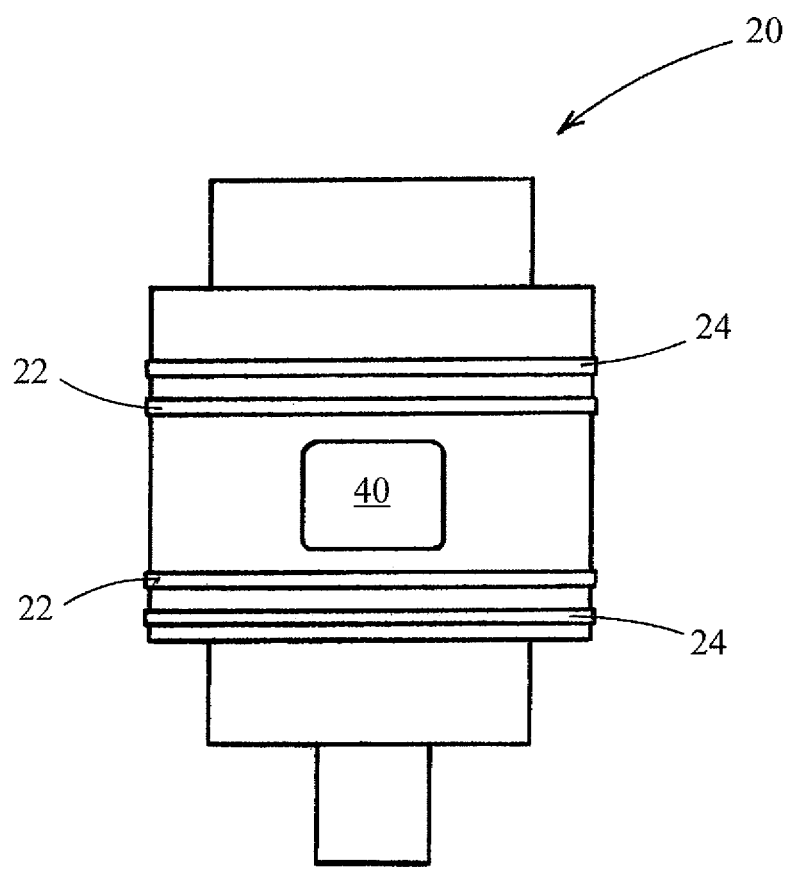
FIG. 1 is a front elevation view of the rotary combustion chamber assembly showing the passage from the chamber as well as ring combustion and oil seals.

In order to better understand how the proposed engine would improve hydrogen combustion, the preferred embodiment is now described in more detail. The major novel element is the combustion system which includes a single centrally located rotary combustion chamber (RCC) 30 serving all four cylinders in a four stroke DOHC variable valve actuation (VVA) engine 10. The RCC assembly 20 contains a spherical combustion chamber 30 with a passage and opening. This opening, combustion valve 40, sequentially accesses the combustion chamber 50 of each cylinder 52 as it is driven at one half the crankshaft speed by gear 28. A fuel injector or combination fuel injector/spark plug (FISP) 60 injects fuel directly into RCC 30. A small pre-combustion chamber 70 is located next to FISP 60 collecting higher concentrations of fuel and is used to initiate combustion.

Conventional ring seals 22 located above and below combustion valve opening 40 on RCC assembly 20 contain combustion gas on one axis while a series of vertical ceramic seals 32 located in the block contain the charge on the other axis. Spring 76 applies pressure to vertical seal 32 keeping it in contact with the exterior of RCC assembly 20 to prevent passage of combustion gas past the seal. After combustion valve 40 closes, a small amount of lubricant is injected in a space behind the vertical seal 32 by lubrication jet 34 to both lubricate and cool these seals. Vertical seal lubrication is achieved by a small amount of lubricant seeping past the seal and being deposited onto the outside of RCC assembly 20. This film lubricates succeeding vertical seals.

Ring seals 22 located on RCC assembly 20 avoid component failure by several means. First, a dedicated lubricant injector can be located in the block (not shown) to lubricate each of the RCC combustion seals. Second, a groove extending from the adjacent oil seals to the center of each combustion seal can also supply lubricant. Finally, low-friction hard coatings recently developed by Argonne National Laboratory may not require lubrication.

To prevent thermal deformation of RCC assembly 20, several measures are taken. First, the combustion chamber and passage is ceramic coated. Ideally, these coatings should control the high combustion chamber temperatures, but if not, other means are available to further cool the assembly. Since RCC assembly 20 is fully contained within the block and head, oil can be used to cool and lubricate upper and lower journal bearings 80 and 82 respectively. This oil is contained by oil rings 24 placed between the bearings and RCC combustion rings 22. Space between the RCC assembly 20 and block and head allows the oil to freely move to cool the assembly. If necessary, oil passages 86 are easily placed within the RCC assembly. Some additional cooling can be generated by transfer of heat to the adjacent head assembly and dissipated by cooling fins 92 located in the intake portion of that assembly. Passages 102 from each cylinder 52 further cool the exterior of RCC assembly 20 as it rotates past each of these openings during non-combustion cycles. Finally, additional coolant passages can be located near the RCC assembly in both the head and block.

Figure 2:
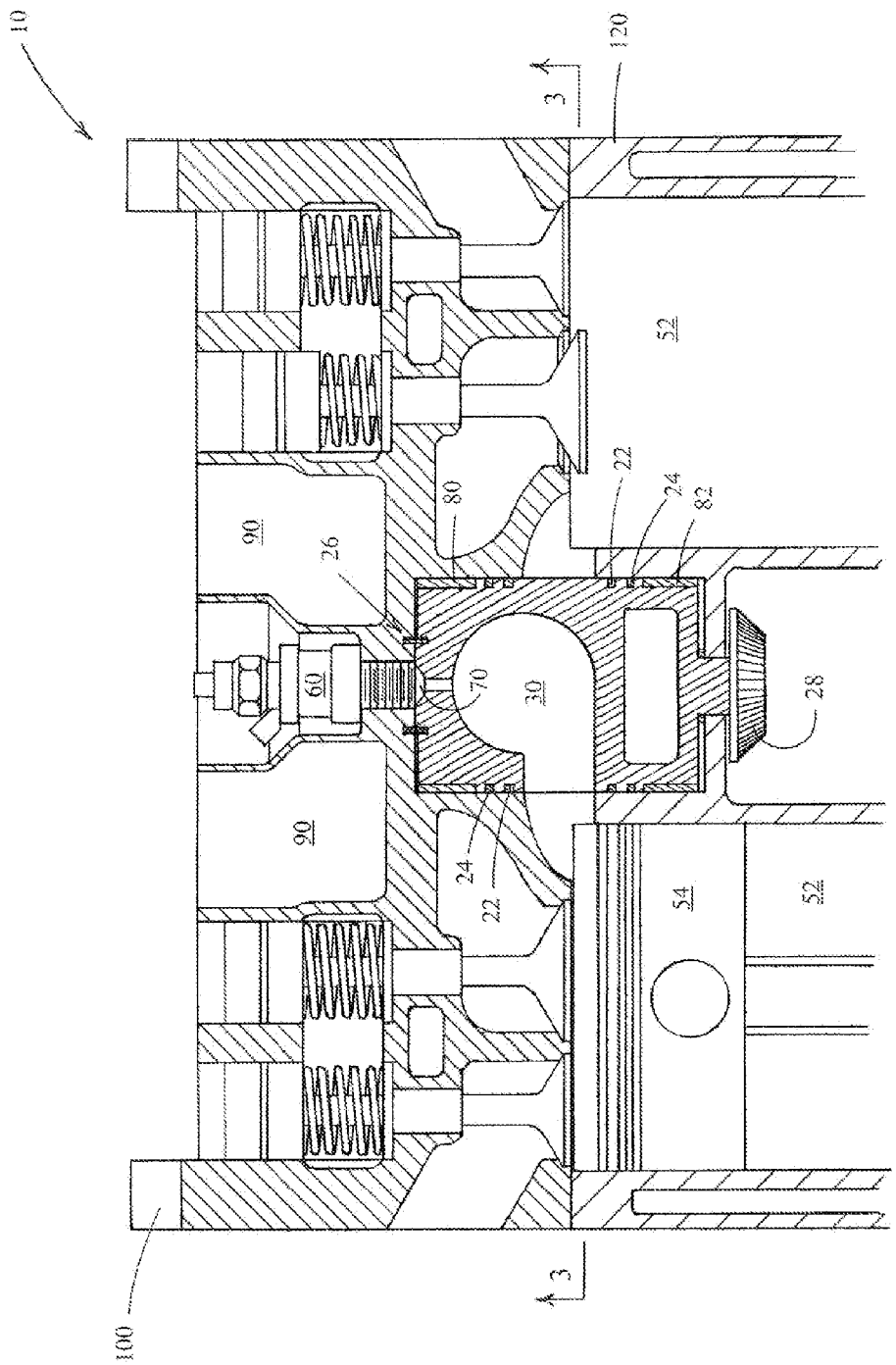
FIG. 2 is a diagonal cross-sectional view of the engine block and head showing the position of the rotary combustion chamber in the version which receives the entire compression charge. Also shown are the ring type combustion and oil seals, the fuel injector, and the small pre-combustion chamber just above the rotary combustion chamber.
Figure 3:
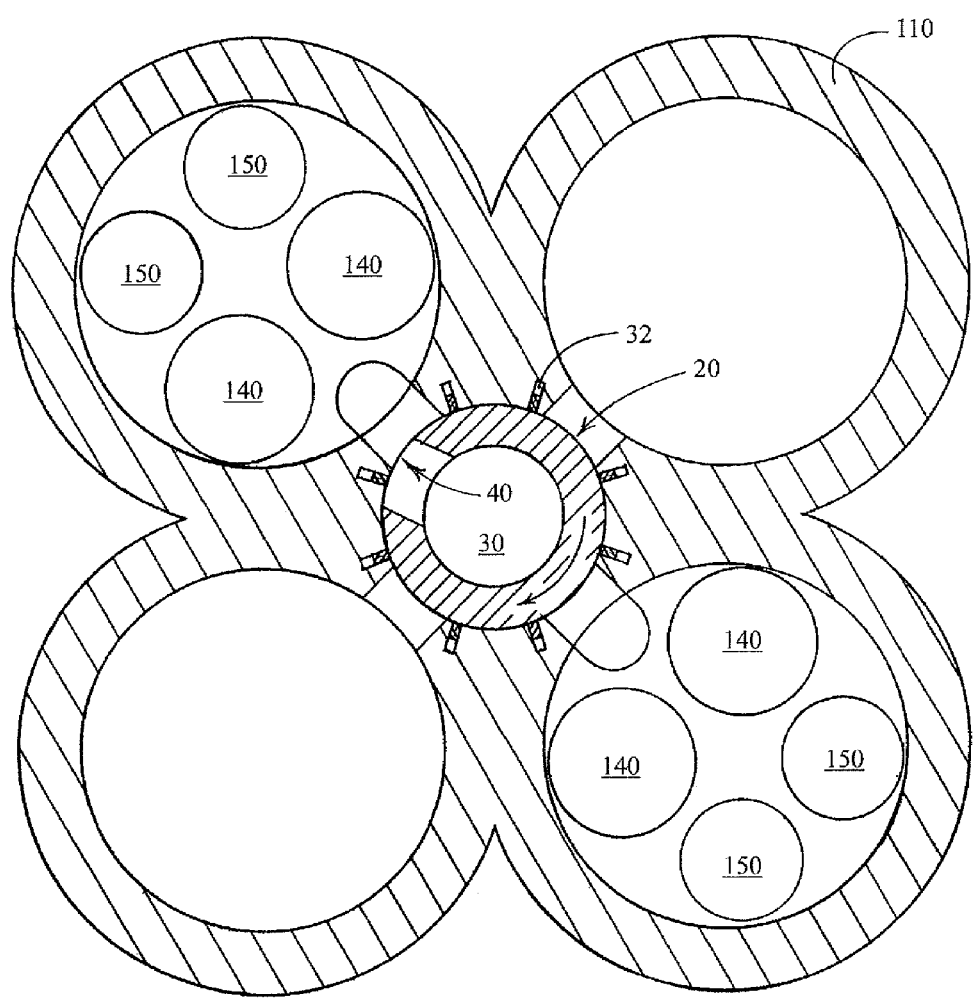
FIG. 3 is an upward cross-sectional view through the block to show the arrangement of the valves in two representative cylinders and positions of the vertical rotary combustion seals.
Figure 4:
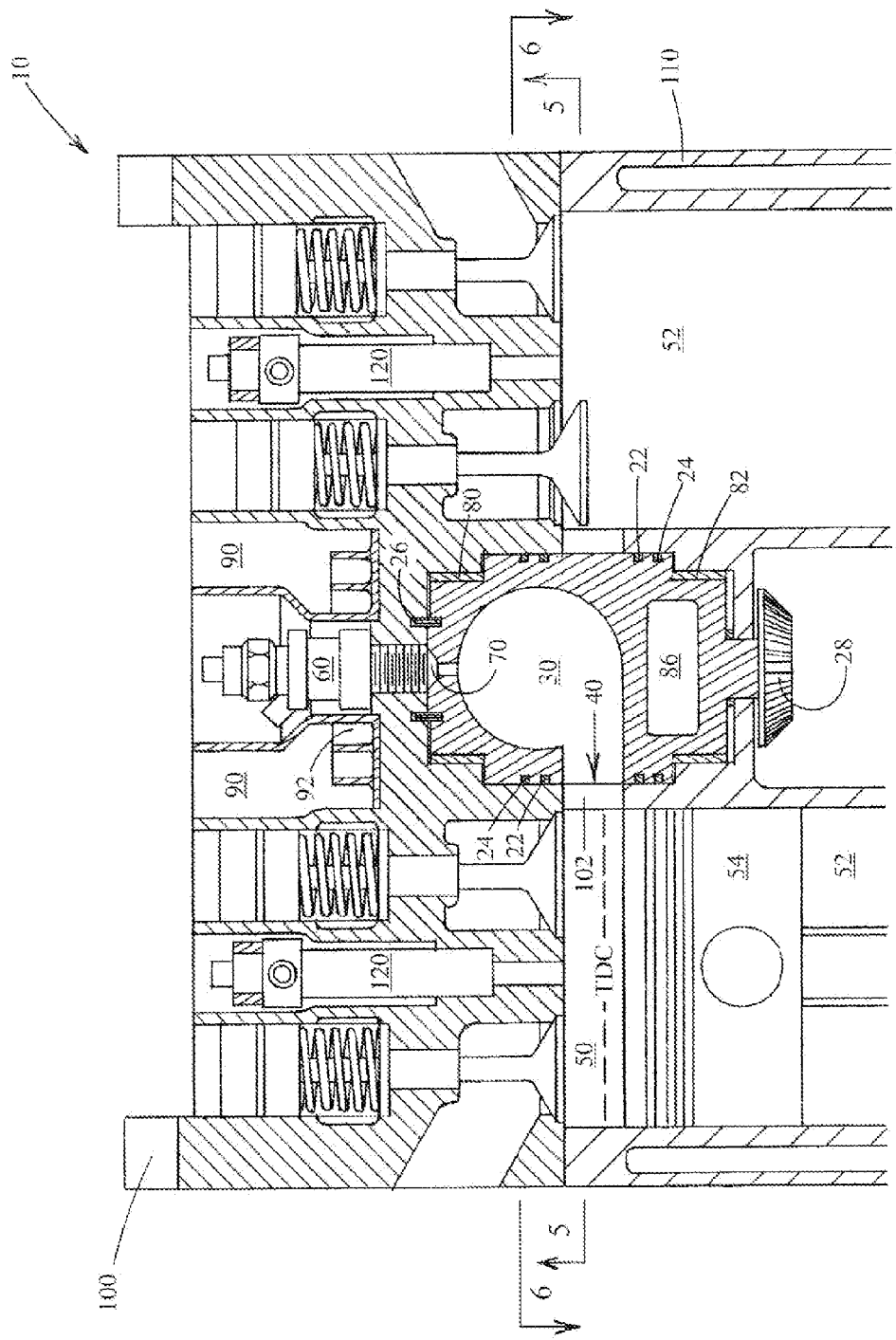
FIG. 4 is a diagonal cross-sectional view of the engine block and head through 4-4 of FIG. 5 illustrating the rotary combustion chamber in conjunction with head combustion chambers in the split compression charge version.
Figure 5:
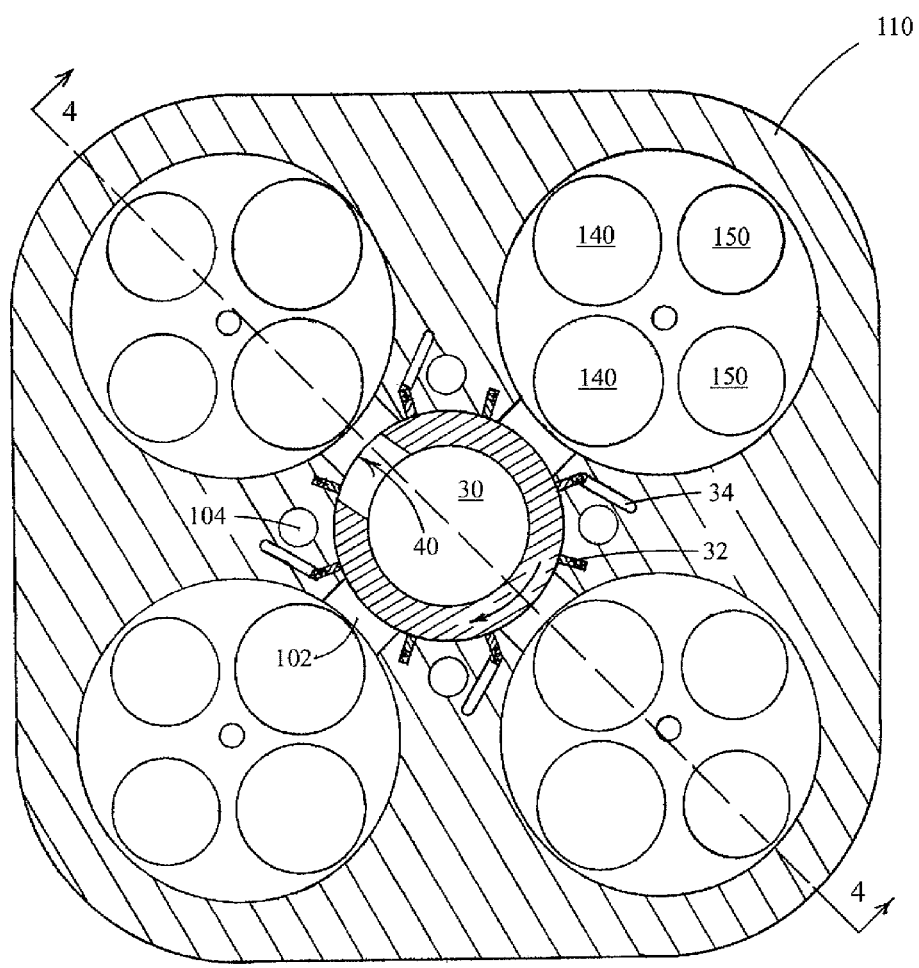
FIG. 5 is an upward cross-sectional view through 5-5 of the block of FIG. 4 to show the arrangement of the valves and positions of the vertical rotary combustion seals. Also shown are the vertical seal lubrication jets and head bolt holes used to firmly attach the head to seal the rotary combustion assembly.
Figure 6:
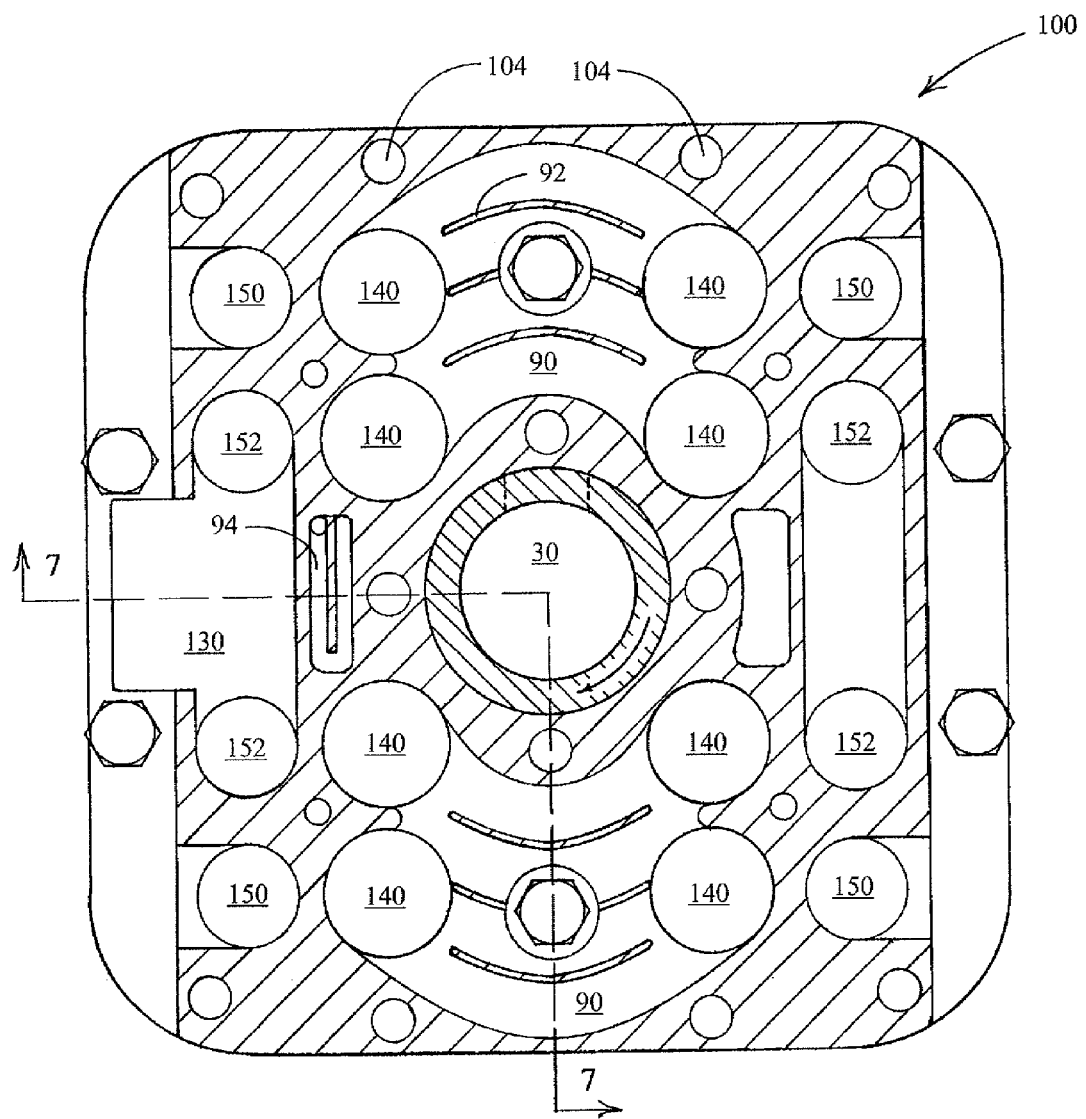
FIG. 6 is a cross-sectional view through 6-6 of FIG. 4 showing the placement of head bolts, interior intake and exhaust manifolds, and the location of the fuel and intake air pre-heater elements.
Figure 7:
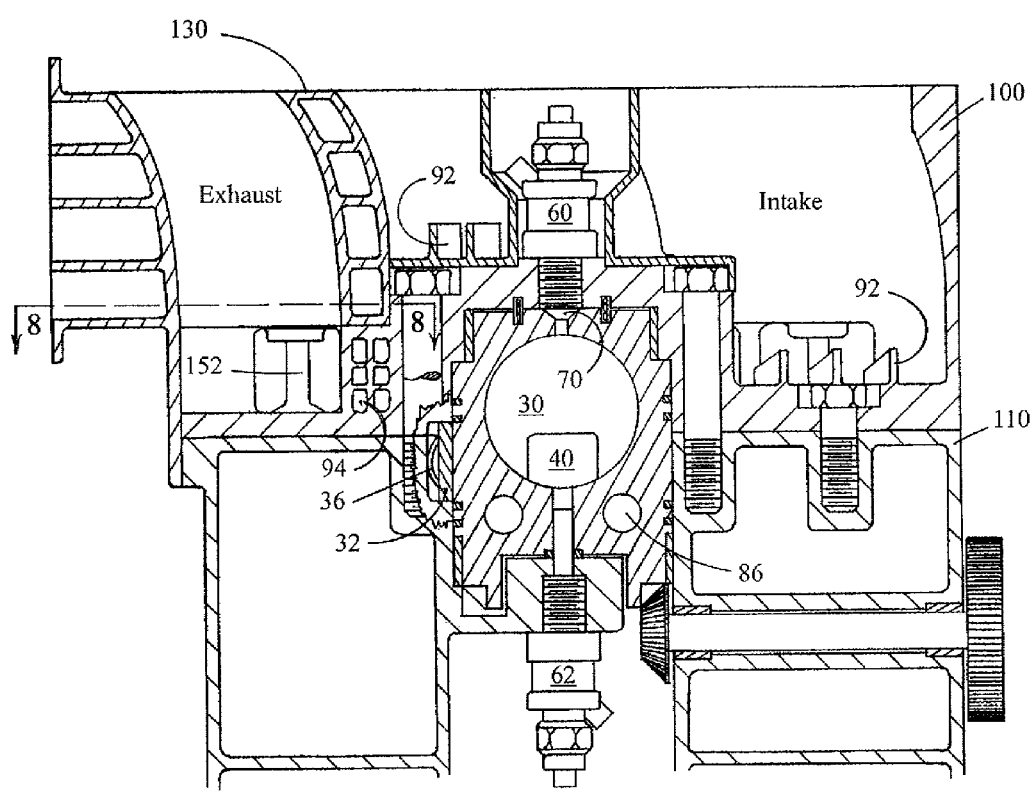
FIG. 7 is a 90 degree cross-sectional view through 7-7 of FIG. 6 illustrating detail of the vertical rotary combustion chamber seal and spring (cut away section), intake charge heating fins, fuel heating element, and the intake charge pre-heater.
Figure 8:
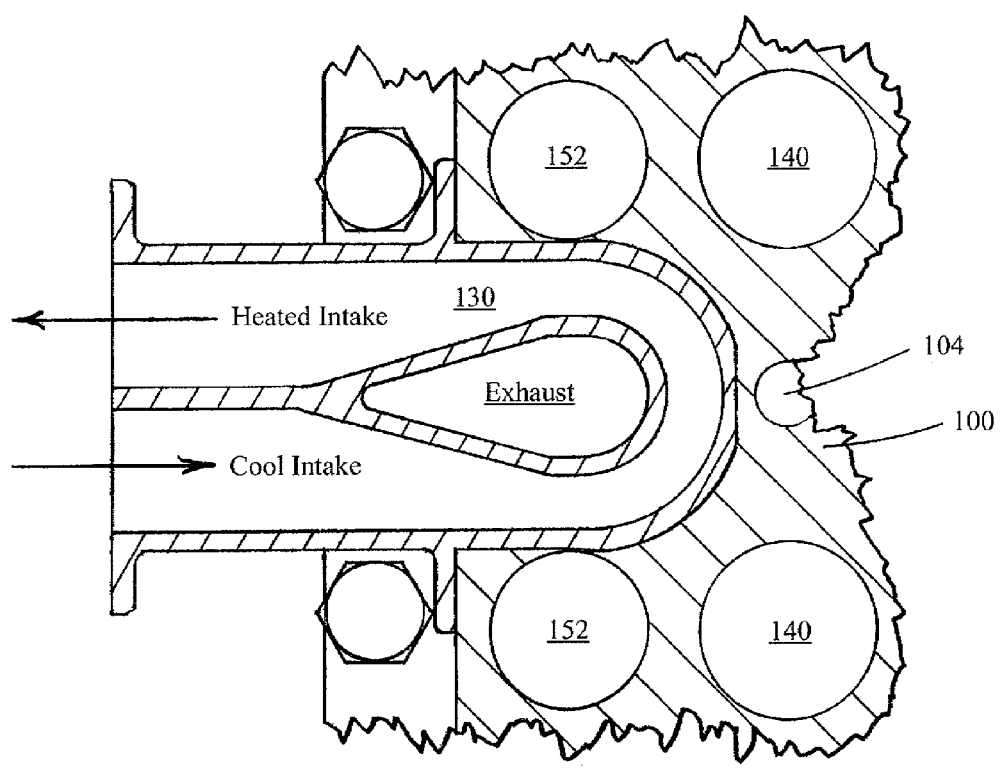
FIG. 8 is a broken cross-section through the head and intake charge pre-heater through 8-8 of FIG. 7.

Two versions of the RCC engine are illustrated. FIGS. 2 and 3 depict a four cylinder RCC engine in which the entire compression charge is transferred to RCC 30 while the remaining drawings depict a version where the compression charge is split in half. While both versions can operate with spark ignition (SI), diesel operation in the split charge version would be more challenging. As a result, for the purposes of this discussion, the split charge version will be identified as SI, while the other will be designated as diesel. Discrete fuel injectors 120 are provided for each combustion chamber 50 in the SI version while only a single fuel injector is needed for the diesel version. While both use DOHC systems and can incorporate variable valve timing, the intake and exhaust valves in the diesel are at a 45 degree angle with respect to the primary axis of the engine. Generally, the rest of the features are common to both types, and are not illustrated in all the drawings.

Figure 9:
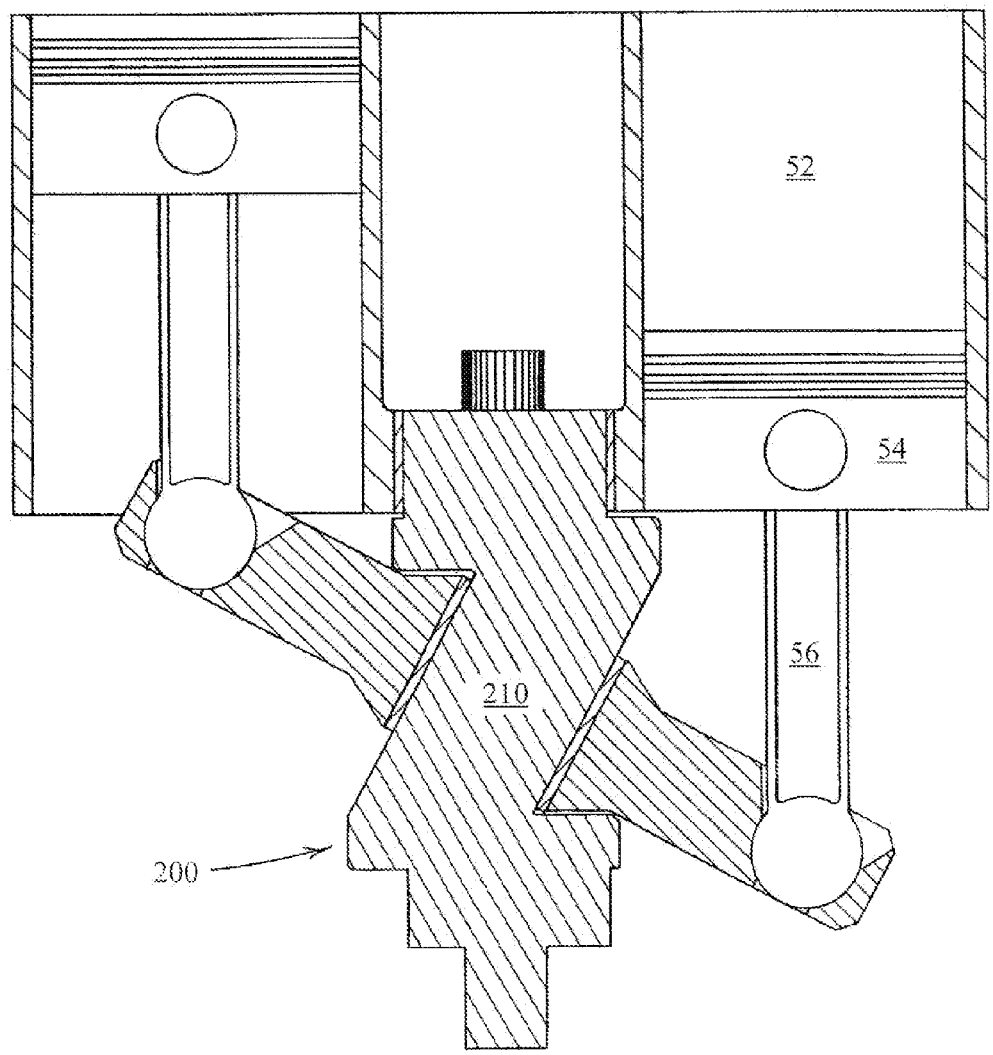
FIG. 9 is a partial cross-sectional view of the block and simplified z-crankshaft to illustrate the relationship of the z-crankshaft and cylinders. (The rotational control rod and thrust bearings used with the z-crank are not shown.)

In operation, heat exchanger 130 heats the intake air from residual exhaust heat. Next, a supercharger (not shown) forces air into the intake manifold area of the head. This charge is further heated by fins 92 located in the intake passages before it enters the cylinder 52. In the diesel version, the air is compressed until combustion valve 40 opens late in the compression stroke. All the air is quickly transferred to RCC 30. During this transfer, the fuel is injected directly into the RCC. Under relatively high pressure, the air rushes with great speed into RCC 30 while the fuel is being injected to produce thorough mixing in a short period of time. The residual rich mixture in pre-combustion chamber 70 quickly ignites and the resulting jet ignites the RCC charge. The charge now passes through cylinder passage 102 into the cylinder 52 providing power to the piston 54. As shown in FIG. 9, the expanding gas in the cylinder 52 drives the piston down during the power stroke. The driving rod 56 connects to a Z-shaft assembly 200 that converts the reciprocating motion of the piston in rotational motion of the Z-shaft 210. After most of the charge has been transferred to the cylinder 52, combustion valve 40 closes while rotating to the next cylinder 52 to repeat the process. As the charge is exhausted through the head, the exhaust from the interior exhaust valves 152 heats the intake charge while the outer exhaust valves 150 supply heat to the on-board reformer (not shown).

The operation of the SI version has a few differences. A supercharger is also used with the air being heated by it and heat exchanger 130 in the head which then enters the cylinder 52. However, after intake valves 140 are closed and the air is being compressed, fuel is injected into the cylinder 52. Half of this charge is then transferred into RCC 30 late in the compression cycle. During this transfer, a small amount of fuel is fed into the pre-combustion chamber 70. A few crank angle degrees later, SPFI 60 ignites the richer (close to stoichiometric) charge. The resulting jet ignites the RCC 30 charge which in turn ignites the head combustion chamber 50 charge. This combustion sequence is sequentially repeated for each cylinder 52 as the RCC accesses each cylinder combustion chamber 50. Exhaust is pushed out of the cylinder 52 through the two exhaust valves as in the diesel version previously described.

Another version of the combustion process is possible in either version. Steam produced by waste water and heat recovered from the combustion process and injected during the final stage of the combustion stroke would increase cylinder pressure thereby increasing output. However, both versions would require an additional dedicated injector for each cylinder 52. Use of this system should increase thermal efficiency and may eliminate the need for a supercharger especially in the diesel version.

Additional variations in fuel injection methods are possible for the depicted SI and diesel RCC engines. With the depicted version splitting the charge, both DI and IDI are used. Further, additional injectors 62 could be added to either location allowing either dual fuel or steam injection. Mostly, similar injector strategies are possible in the un-split charge version.

Supercharging would increase both the output and the thermal efficiency. In a study investigating supercharging in port fuel injected hydrogen engines, Verhelst et. al. found supercharging between 0.5 and 1.0 bar produced the highest efficiency with the greatest power produced at 1.2 bar. Sebastian Verhelst, Joachim Demuynck, Steven Martin, Michael Vermeir and Roger Sierens, "Investigation of Supercharging Strategies for PFI Hydrogen Engines," SAE technical paper 2010-01-0582. This would support continuous supercharging at the lower levels with increased supercharging to 1.2 bar at maximum power. Due to differences in the combustion system, it is unclear whether this conclusion applies to the RCC engine. It may be possible to increase the amount of supercharging in the split compression charge engine to achieve higher output and greater thermal efficiency. In this version, less compression work is needed to produce higher outputs. This is due to the lower compression ratio used, reduced heat loss, and larger total combustion chamber volume per stroke, and splitting the compression charge.

Since the operation of the RCC serves all four cylinders in a consecutive fashion, the firing order must follow the same sequence. With four cylinders, access to each cylinder 52 in this order necessitates that the cylinders be parallel. To support this arrangement, several crankshaft designs can be used. The most obvious is the dual crankshaft. This design has some advantages such as being compact, and counter-rotating operation reduces vibration. The compactness is somewhat compromised by the central placement of the RCC assembly making the entire engine larger. A more suitable solution is the z-crankshaft which can be made compact and offers the option of variable compression. With these crankshaft options, the engine can be offered in the more popular 3, 4, 6, and 8 cylinder configurations, with the 6 & 8 cylinder versions using opposed cylinders.

The first priority of the RCC engine is to increase thermal efficiency. This is done by addressing the two greatest contributors to enthalpy which are combustion process and heat transfer losses. Heat transfer losses are first addressed. The greatest contributor to reduction in this factor is the RCC. Since the RCC is exposed only to already hot compressed gas from the late compression cycle and the hot gas of the combustion cycle, the operational heat range is significantly reduced, possibly by as much as 40%. Further, since the RCC serves all four cylinders of a four stroke engine, combustion in the RCC is almost continuous creating only very brief exposure to the lower heat range. Low temperature combustion reduces the upper thermal limit, and, ceramic coatings in the RCC and passage provide a barrier to heat loss. Other areas of reduced heat loss include ceramic coated pistons and cylinder combustion chambers. Finally, use of the z-crank reduces side thrust forces on the cylinder walls possibly allowing them to be ceramic coated.

With respect to reducing combustion process losses, several measures are taken. A staged combustion process preheats the reactants closer to chemical equilibrium. First, the incoming intake charge is preheated by the heat exchange with the exhaust with additional heat added by supercharging. The feedstock fuel, (diesel, gasoline, CNG etc.) is preheated in the head and is added to the preheated intake charge which then flows through the reformer to upgrade the fuel to syngas or hydrogen. In the SI version, the fuel is injected into the cylinder combustion chamber during the compression stroke. About 25 crank angle degrees before the piston 54 reaches top dead center (TDC), the rotating RCC assembly opens the combustion valve. As about half of the charge enters the RCC, the pre-combustion chamber injector injects a small amount of fuel into that chamber while the intake charge passing into the RCC mixes with the very hot exhaust residuals from the previous power stroke. The FISP ignites the richer fuel in the pre-combustion chamber producing a hydrogen jet igniting the RCC charge. Ignition of the RCC charge likewise produces a combusting jet to ignite the cylinder combustion chamber charge. The diesel version, lacking a head combustion chamber, skips this last combustion phase but operates at considerably greater compression ratios to increase efficiency. Other elements contributing to increased thermal efficiency include, VVA, z-crank with variable compression, and unthrottled operation.

Hydrogen combustion in the RCC engine is superior to other ICE formats for several reasons. First, DI and IDI eliminate the backflash, pre-ignition and reduced power problems. It should be noted, no reliable high pressure commercial injectors are available to date, but would be expected to become available as hydrogen ICE development progresses. As with conventional DI hydrogen engines, this remains a potential problem with the SI RCC engine. The diesel version avoids this problem by injecting fuel just as the combustion valve opens while the RCC pressure is still very low allowing the use of a low pressure injector.

The RCC engine uses other additional features to counter pre-ignition. Hot spots in the combustion chamber are one of the principal causes of this problem. Flat pistons, flat heads, two exhaust valves per cylinder, low temperature combustion (in the SI version), exhaust gas recirculation, charge stratification, very lean combustion chamber mixtures, placement of the spark plug in the RCC pre-chamber, ceramic coatings, and possible use of water injection all serve to reduce pre-ignition.

Another problem with current DI Hydrogen engines is incomplete mixing of the charge causing misfire, high NOx emissions, reduced efficiency and power loss. Both RCC versions mix the fuel and air better than conventional engines. Principally, this is accomplished by the combustion valve producing a very high velocity stream mixing the incoming charge with residual exhaust gas in the RCC. In the SI version, DI into the early compression cycle cylinder 52 starts the mixing process with a very small amount of fuel added to the pre-combustion chamber in the RCC after the combustion valve opens. In the diesel version, IDI into the RCC while the air charge rushes past the opening from the pre-combustion chamber mixes the charge. In both versions, stable ignition results from the richer pre-combustion chamber charge producing a hydrogen jet to ignite the RCC charge. In the SI version, the pre-combustion chamber 70 can incorporate a related design by MAHLE Powertrain LLC producing multiple ignition sites which they claim decreases combustion variability while increasing fuel economy by 18%. See, William P. Attard, Neil Frazer, Patrick Parsons, Elisa Toulson, "A Turbulent Jet Ignition Pre-Chamber Combustion System for Large Fuel Economy Improvements in a Modern Vehicle Powertrain," SAE technical paper 2010-01-1457.

Those skilled in ICE technology will quickly recognize the similarities of the RCC engine with IDI Ricardo diesels and will also be aware of the limitations of that technology. Perhaps the greatest disadvantage of the conventional IDI diesel is its' 10-15% lower thermal efficiency. Primarily, this is due to increased heat and throttling losses from larger combustion surface areas and the heat transfer losses of the swirl chamber charge back to the main combustion chamber. Several key design elements of the RCC engine mitigate these problems. First, the combustion valve prevents the compression charge from entering the RCC until late in the cycle. Then, after the compression charge is highly compressed, the combustion valve opens producing a very high velocity stream to mix the RCC charge. Because the velocity of the incoming compression charge is so high, the combustion valve opening can be enlarged and still provide sufficient velocity to mix the charge. A larger opening reduces the throttling losses when the charge exits the RCC. Second, the RCC and passage is ceramic coated to reduce heat transfer. Third, the greatly reduced heat range of the RCC and fourth, shorter duration of exposures to the lower temperature range, and fifth, low temperature combustion all reduce heat loss. With these improvements, it is likely the thermal efficiency of the RCC engine will surpass DI formats.

Another relatively serious problem with IDI engines is uneven thermal loading of the pistons. This is caused by the combustion products contacting the piston areas off center producing hot spots resulting in thermal deformation of the pistons. Both the SI and diesel RCC engine versions minimize this problem by timing the combustion products arrival in the cylinder combustion area after the piston 54 is below the combustion valve opening.

Again, those skilled in ICE technology will also recognize the RCC is a type of rotary valve. Rotary valve engines have not become popular for several reasons. Primarily, poppet valves are more effective sealing the high pressures encountered in the combustion process with rotary valve engines commonly having either excessive oil consumption or inadequate combustion chamber sealing. It should be noted, the RCC is fully contained within the head and block of the engine. The only exit for the combustion gas is through the combustion valve. The rings above the combustion valve opening should be more effective than conventional engine rings because there is no place for the gas to escape past the rings. The vertical seals located around the RCC assembly prevent the movement of gas to adjacent cycles and are modeled on Wankel rotary engine ceramic apex seals. In The RCC engine, these seals are lubricated by oil jets which terminate in the space behind the seals. A small amount of oil seeps past these seals to be deposited on the exterior of the RCC assembly to lubricate the next trailing seal. In this manner, the seals are both lubricated and cooled extending their life cycles. It also serves to increase the sealing capability of the system. If sufficiently cooled, less expensive non-ceramic seals could be used. Finally, "O" ring seal 26 prevents the escape of gas from pre-combustion chamber 70.

A similar split charge combustion system is illustrated by Muth (U.S. Pat. No. 7,841,308). The RCC engine combustion system is an improved version of that disclosure. The improvements include: use in a poppet valve engine greatly simplifies sealing the combustion chamber; a considerably larger combustion valve opening and shorter passage reduce throttling and heat transfer losses; and high temperature operation of the RCC is much better controlled through improved cooling.

The preferred embodiment, as previously noted, uses a z-crankshaft to produce a barrel type engine. Not withstanding the compactness this arrangement provides, it also increases performance. Shulenberger uses a z-crankshaft in a conventional barrel engine equipped with variable compression (VCR) and claims a 25% thermodynamic gain due to VCR and engine downsizing. This arrangement is easily adapted to the RCC engine. See, Arthur Melvin Shulenberger, Luc Patrick Deschaumes, "Axial piston machines," U.S. Pat. No. 6,968,751, November 2005.

While Shulenberger uses his design to incorporate VCR using traditional fuels, a study by Y. Nakamura et. al propose using a z-crank with hydrogen gas-jet combustion to produce knock-less and low NOx emissions in a hydrogen fueled engine. See, Y. Nakamura, K. Yamamoto, N. Nakajima, Y. Kidoguchi, K. Miwa, "Noble Hydrogen with Knock-less and Low NOx Emission Employing Hydrogen Gas-Jet Combustion and Z-crankshaft Mechanism," SAE technical paper 2007-24-0122. A spark plug located close to the injection nozzle initiates combustion just after the start of injection. Increased thermal efficiency is thought to be due to slower piston speeds near TDC producing stable quasi-constant volumetric combustion. Further, the z-crank exhibits less thermal efficiency deterioration at late ignition timed combustion. Although the Nakamura design changes the crankshaft axis, their conclusions should apply to the Shulenberger and RCC engine designs.

The MAHLE, Nakamura and RCC designs all use a common strategy to increase combustion stability; a locally richer mixture jet ignites the main charge. Literally, the SI RCC engine takes this strategy one step farther. Although the charge equivalence ratio is reduced in the RCC compared to the pre-combustion chamber, the RCC fuel injector could slightly enrich the RCC chamber charge by injecting fuel into the RCC. This would set up a series of combustion events where increasing thermal energy (jets) are used to ignite increasingly dilute charges. Therefore, stable combustion should be achieved with even more dilute charges resulting in additional fuel savings.

Before any hydrogen engine can make significant gains towards the goals of reducing greenhouse gas emissions and reducing foreign oil use, the engine must attain high levels of use. This can only happen if the engine is cost competitive. Probably any hydrogen ICE will cost somewhat more than current use engines. Mostly, this is due to most engines making use of a supercharger, VVA, ceramic coatings, and, if available, an on-board reformer. With reference to the reformer cost, the Argonne National Laboratory is pursuing study on less expensive non-noble metal reformers and if the reformer is very effective, the catalytic converter can be eliminated to offset the reformer cost.

Comparing conventional hydrogen engines with the RCC engine, the cost issue is difficult to predict. Since the RCC engine is really an upgraded conventional engine, most costs would be the same. The RCC engine has the additional element of the RCC which would add to the cost. However, only one is needed per engine. Also, the RCC engine should be more efficient allowing downsizing the engine and should produce equivalent output with lower temperature operation. This would allow less expensive fuel injectors to be used in the SI version. In the diesel version, only one low pressure injector would be required which should reduce the total engine cost but would be partially offset by the increased operating combustion pressure adding some cost to the engine. Finally, the RCC engine should solve the pre-ignition and combustion stability problems inherent in conventional hydrogen ICE technology. The costs associated with completely solving these problems with conventional engines are not known because no acceptable solution has yet been found.

Although, the RCC engine was specifically designed to burn hydrogen, most of the thermodynamic improvements would also be realized with more conventional fuels. Due to this, the RCC engine could first be developed as an interim engine using present fuels. This strategy could be taken in lieu of satisfactory development of on-board fuel reforming.

Because the RCC engine is an upgraded conventional ICE, the only difference in building one is the RCC assembly and seals. Since the technology used in the RCC is based on IDI diesel and rotary engine technology, this should not pose significant barriers to development. Therefore, the development of the RCC engine could be relatively quick, given the desire to do so.

Based on the foregoing, it is apparent the rotary combustion chamber engine of the present invention has numerous advantages over conventional poppet valve engines. First, it should have higher thermodynamic efficiency. Second, it should have superior fuel economy. Third, it should exhibit better hydrogen fuel combustion characteristics. Lastly, it should produce fewer emissions.

The present invention may of course, be carried out in other specific ways than those herein set forth without parting from the spirit and essential characteristics of the invention. The presented embodiments are, therefore, to be in all respects as illustrative and not restrictive, and all changes coming within the meaning and equivalency range of the appended claims are intended to be embraced therein.

What is claimed is:

1. A four stroke poppet valve engine, the poppet valve engine comprising;
an engine block having a plurality of cylinders;
one or more pistons mounted in respective cylinders;

one or more crankshafts rotatably mounted to the engine block, each crankshaft being driven by one or more of the pistons;

a head mounted to said engine block;

intake passages in the head to direct air to the cylinders;

exhaust passages in the head to exhaust combustion gasses from the cylinders;

a rotary combustion chamber assembly located between the cylinders;

a rotary combustion chamber located within the rotary combustion chamber assembly;

a pre-combustion chamber located adjacent to the rotary combustion chamber;

a passage in the rotary combustion chamber assembly extending from the rotary combustion chamber to connect the rotary combustion chamber to each cylinder as the rotary combustion chamber assembly rotates; and an igniter for igniting fuel in the rotary combustion chamber.

2. The poppet valve engine of claim 1 further comprising a first fuel injector to inject fuel into the rotary combustion chamber.

3. The poppet valve engine of claim 1 further comprising a plurality of fuel injectors to inject fuel into respective cylinders.

4. The poppet valve engine of claim 1 further comprising a ceramic coating on the rotary combustion chamber to cool the rotary combustion chamber.

5. The poppet valve engine of claim 1 wherein the rotary combustion chamber assembly is positioned partially within the head and partially in the engine block.

6. The poppet valve engine of claim 1 further comprising a set of "O" ring seals around the rotary combustion chamber assembly to constrain compression and combustion gas.

7. The poppet valve engine of claim 1 further comprising a combustion chamber within each cylinder connecting to the rotary combustion chamber.

8. The four stroke poppet valve engine of claim 2 wherein the fuel injector and igniter are assembled into a single unit.

9. The four stroke poppet valve engine of claim 8 including a second fuel injector to inject fuel into the rotary combustion chamber.

10. The four-stroke poppet valve engine of claim 9 wherein the first and second fuel injectors are disposed at opposing ends of the rotary combustion valve assembly.

11. The poppet valve engine of claim 1 wherein the igniter is located adjacent to the pre-combustion chamber.

12. The poppet valve engine of claim 6 further comprising flat seals positioned 90 degrees to the axis of the "O" ring seals to constrain the compression and the combustion gas.

13. The poppet valve engine of claim 12 further comprising springs to exert pressure on the flat seals against the rotary combustion chamber assembly.

14. The poppet valve engine of claim 13 further comprising oil jets positioned behind the springs to cool and lubricate said springs.

15. The poppet valve engine of claim 13 further including a second set of "O" ring seals located between the first "O" ring seals and the bearings to constrain lubricating oil.

16. The poppet valve engine of claim 13 further comprising a chamber and head passages in the head to heat the fuel.

17. The poppet valve engine of claim 13 further comprising an intake charge pre-heater.

18. The poppet valve engine of claim 15 further comprising oil contained between the second set of "O" ring seals and the bearings on the outside of the rotary combustion chamber assembly to cool the rotary combustion chamber assembly.

19. The poppet valve engine of claim 18 further comprising oil passages within the rotary combustion chamber assembly.

* * * * *